(12) United States Patent
Zhang et al.

(10) Patent No.: US 10,740,825 B1
(45) Date of Patent: Aug. 11, 2020

(54) USER CLUSTERING IN A LATENT SPACE FOR IDENTIFYING USER INTEREST IN A CONTENT ITEM

(71) Applicant: Facebook, Inc., Menlo Park, CA (US)

(72) Inventors: Ying Zhang, Palo Alto, CA (US); Yang Yang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 256 days.

(21) Appl. No.: 15/950,064

(22) Filed: Apr. 10, 2018

(51) Int. Cl.
| | | |
|---|---|---|
| *G06Q 30/00* | (2012.01) | |
| *G06Q 30/06* | (2012.01) | |
| *G06F 16/248* | (2019.01) | |
| *G06F 16/9535* | (2019.01) | |
| *G06F 16/2457* | (2019.01) | |

(52) U.S. Cl.
CPC ....... *G06Q 30/0631* (2013.01); *G06F 16/248* (2019.01); *G06F 16/24575* (2019.01); *G06F 16/24578* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 9,589,237 B1 * | 3/2017 | Qamar | ................. | G06F 16/245 |
| 10,210,246 B2 * | 2/2019 | Stojanovic | ............. | G06Q 30/02 |
| 10,445,062 B2 * | 10/2019 | Oberbreckling | .......... | G06F 7/02 |
| 2017/0178023 A1 * | 6/2017 | Green | ................. | G06F 16/9535 |
| 2017/0220652 A1 * | 8/2017 | Kazi | ..................... | G06F 16/248 |
| 2017/0255862 A1 * | 9/2017 | Li | ......................... | G06N 5/022 |
| 2017/0293693 A1 * | 10/2017 | Oros | ................. | G06F 16/24556 |
| 2018/0246973 A1 * | 8/2018 | Zhao | ................... | G06F 16/9535 |
| 2019/0080383 A1 * | 3/2019 | Garcia Duran | ...... | G06N 3/0427 |

OTHER PUBLICATIONS

Mihajlo Grbovic et al. "E-commerce in Your Inbox: Product Recommendations at Scale" KDD '15, Aug. 10-13, 2015, Sydney, NSW, Australia© 2015 ACM (Year: 2015).*

* cited by examiner

*Primary Examiner* — Naeem U Haq
(74) *Attorney, Agent, or Firm* — Fenwick & West LLP

(57) ABSTRACT

An online system targets users with a candidate content item. The online system generates a user embedding for each of a plurality of users by identifying content items interacted with by the user, identifying one or more keywords within the content items, identifying word embeddings for each of the identified keywords, and generating the user embedding with the word embeddings. The online system clusters the user embeddings while generating a cluster embedding for each cluster. The online system generates a targeting embedding for the candidate content item. Then the online system generates a score for each cluster based on a comparison of the targeting embedding with each cluster embedding. From the generated scores, the online system ranks and selects some clusters for presentation of the candidate content item.

18 Claims, 6 Drawing Sheets

USER CLUSTERING IN A LATENT SPACE FOR IDENTIFYING USER INTEREST IN A CONTENT ITEM

FIELD OF INVENTION

The present disclosure generally relates to selecting a target audience for content items of an online system and more specifically to clustering users based on user embedding vectors for targeting of content items.

BACKGROUND

Online systems select content for presentation to users based on user profile information. The content presented by the online system may be provided by a third party system. The online system maintains user profiles for all the users of the online system. Online systems target users for the presentation of content items based on the user profiles of the users. However, as the number of users and content item viewed by the users increase, the complexity in determining an affinity for a user to a particular content item also increases. Thus making affinity calculation a computing intensive task. Furthermore, a conventional system typically directs a particular content item to users based on users selecting individual connections to direct the particular content item or by directly selecting characteristics of users to receive the particular content item e.g., specific named interests, etc.

SUMMARY

An online system such as a social networking system or another type of online system targets users with content based on user profile information. The content may be provided by a third party system. The online system maintains user profiles for all the users of the online system. Each profile includes action logs describing various activities performed by that user. One type of action log lists a number of posts on the online system that the user has interacted with. An advertising campaign hosted by the online system has a variety of content items to be presented to users of the online system.

Using the user profiles, the online system generates a user embedding for each user profile. An embedding module generates word embeddings in a latent space by taking one or more large corpuses of text and uses a mathematical model to assign a word embedding to each word in the corpuses of text. Each dimension of the latent space is a latent characteristic holding no explicit meaning but holds meaning that is inferred through the mathematical model. To generate a user embedding for a single user, the online system identifies content items interacted with by the user and identifies one or more keywords within the content items. Each keyword has an associated word embedding derived by the embedding module that represents the keyword in the latent space. The word embeddings of the identified keywords for the content items associated with the user are combined to generate the user embedding associated with that user. This permits a user to be represented by the word embeddings of the content items that a user interacts with, thereby providing a manner in which the online system may compare various users based on each user's interaction with various content items in the online system.

The online system clusters users to evaluate user interest in things (e.g., target groups of users). The online system clusters users based on the generated user embeddings. In one embodiment, the online system performs a principal component analysis on the plurality of user embeddings to determine various clusters. For each cluster, the online system generates a cluster embedding. The online system additionally generates a targeting embedding for the candidate content item based on words or keywords of the candidate content item. Then the online system generates a score for each cluster based on a comparison of the targeting embedding with each cluster embedding. With the generated scores, the online system ranks the clusters and selects one or more clusters based on the ranking. Additionally, the online system may select clusters in the ranking until a reach goal of a number of users for presentation of the candidate content item is surpassed. From the selected clusters, the online system may present users with the candidate content item. Generating clusters of users for the purpose of evaluating interest provides a more streamlined approach of evaluating user interest by groupings of users with similar interactions with content items. Considering clusters compared to considering individual users greatly reduces need of computing resources as there are necessarily less clusters than users.

In some embodiments, multiple levels of clusters are generated. That is, the users within a single cluster can be further clustered to form a set of sub-clusters. With each level of clustering, the clusters are further refined, and the number of users within each cluster is further reduced. Less users per sub-cluster at each progressive level provides an increase in similarity between users with the sub-cluster. For example, at a first level there may be one thousand users clustered into one cluster with a low degree of similarity; however, at a second level there may be one hundred sub-clusters including on average ten users with each sub-cluster having a high degree of similarity. Smaller sub-clusters can also provide improved precision in reaching a reach goal. For example, rather than attempting to achieve a reach goal of 1500 users with clusters sized on average with 10,000 users, the online system can more precisely achieve the reach goal of 1500 users with clusters sized on average with 100 users or 10 users, etc.

This process improves the efficiency of selecting a set of users for presentation of a specific content item. Instead of determining whether each individual user of an online system should be presented with the specific content item, clusters of users with similar attributes (as determined by the keywords of the content items a user interacts with) are selected for presentation. Furthermore, since multiple levels of clustering can be generated, an appropriate level of clustering can be selected based on the reach goal of the content item.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
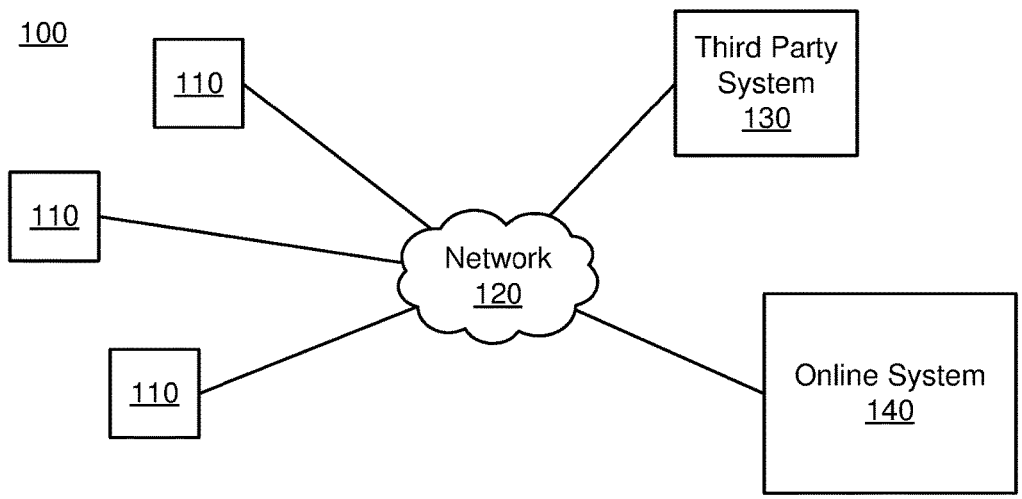
FIG. 1 is a system environment in which an online system operates, in accordance with an embodiment.

FIG. 1 is a system environment 100 in which an online system 140 (such as a social networking system) operates. The online system 140 communicates with client devices 110 and a third party system 130 through a network 120. In alternative configuration, different and/or additional components may be included in the system environment 100. For example, the system environment 100 may include multiple third party systems 130 with which the online system 140 communicates. Although the embodiments disclosed herein describe a social networking system, the techniques disclosed herein are applicable to other online systems that store user profiles.

The client devices 110 are one or more computing devices capable of receiving user input as well as transmitting and/or receiving data via the network 110. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. The client device 110 can receive content items from the online system 140 for display by the client device 110. In the above embodiments, the client device 110 may present content items via a browser application or an API running on the native operating system of the client device 110.

The client devices 110, the online system 140, and the third party system 130 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140. In one embodiment, a third party system 130 is a content provider communicating content items to the online system 140. In an embodiment, the content items provided by the third party system 130 are sponsored content items for which the third party system 130 provides remuneration to the online system 140 for distributing the content items. An example of a sponsored content item is an advertisement. In other embodiments, the third party system 130 provides content or other information for presentation directly to the client device 110. A third party system 130 may also communicate other information to the online system 140, such as metadata describing content items provided to the online system 140. The online system 140 allows users to connect with other users while providing users with the ability of sharing content items for presentation to other users of the online system 140.

Figure 2:
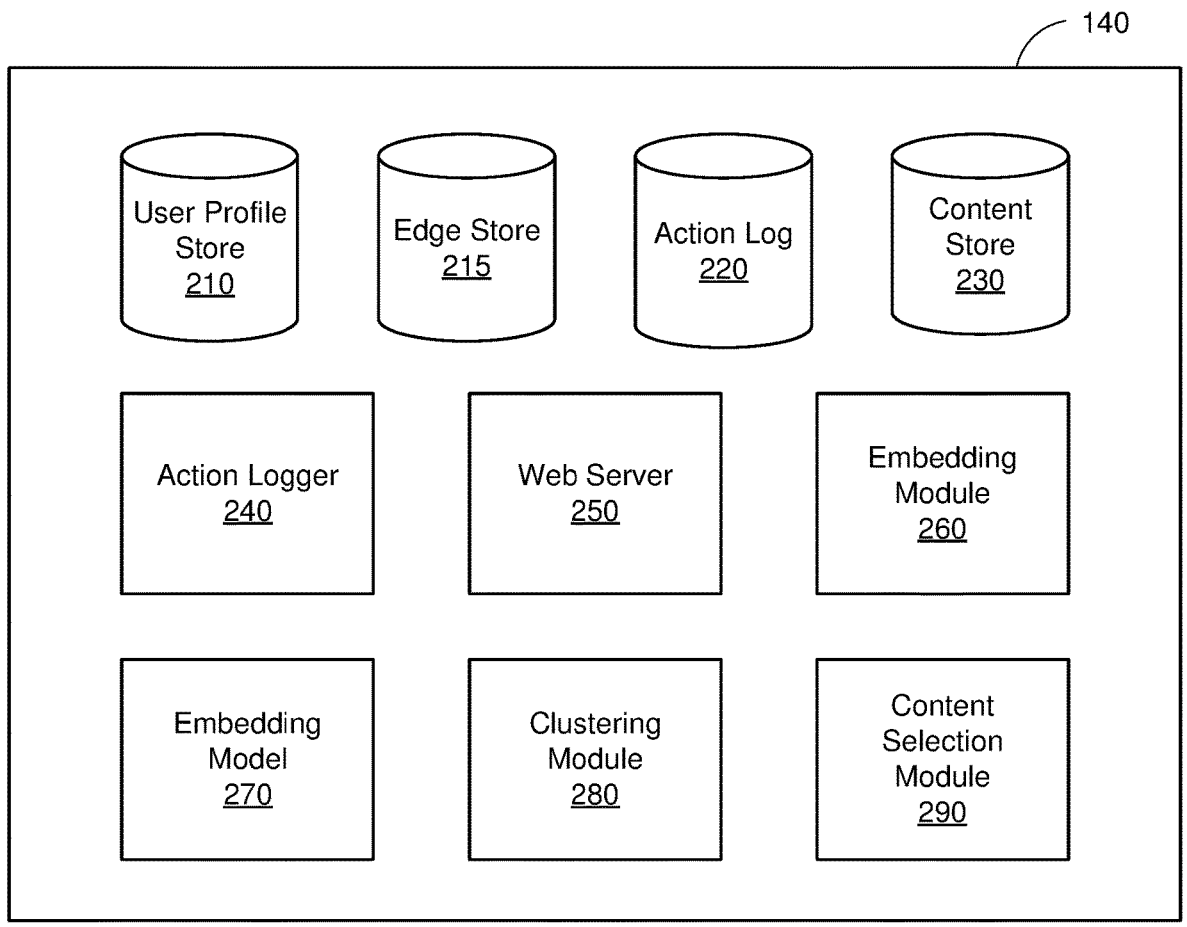
FIG. 2 is a system architecture for the online system of FIG. 1, in accordance with an embodiment.

FIG. 2 is a system architecture of the online system 140, in accordance with an embodiment. The online system 140 shown in FIG. 2 includes a user profile store 210, an edge store 215, a content store 230, an action logger 240, an action log 220, an embedding module 260, an embedding model 270, and a clustering module 280, a content selection module 290, a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 210. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 210 may also maintain references to actions by the corresponding user performed on content items in the content store 230 and stored in the action log 220.

While user profiles in the user profile store 210 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The edge store 215 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 215, in one embodiment. Alternatively, each interaction between a user and a specific object is stored as a separate edge. In some embodiments, connections between users may be stored in the user profile store 210, or the user profile store 210 may access the edge store 215 to determine connections between users.

The action logger 240 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 240 by the application for recordation and association with the user in the action log 220.

The content store 230 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 230, such as status updates, photos tagged by users to be associated with other objects in the online system 140, events, groups, or applications. In some embodiments, objects are received from third-party applications separate from the online system 140. In one embodiment, objects in the content store 230 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 230 include content for presentation to a user and a bid amount. The content may be text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

The embedding module 260 applies machine learning techniques to generate an embedding model 270 that includes embedding vectors for entities of the online system 140 that describes the entities in latent space. As used herein, latent space is a vector space where each dimension or axis of the vector space is a latent or inferred characteristic of the objects in the space. Latent characteristics are characteristics that are not observed, but are rather inferred through a mathematical model from other variables that can be observed. In some embodiments, the embedding model 270 includes user embeddings (or user embedding vectors) for users of the online system 140, cluster embeddings for clusters of users of the online system 140, and word embeddings.

The embedding module 260 generates word embeddings from a large corpus of text. The embedding module 260 assigns word embeddings to each word included in the corpus of text. In some embodiments, the word embeddings are positioned within the latent space such that words with inferred similarities from the corpus of text are located in close proximity. One manner of generating word embeddings from a large corpus of text utilizes a machine learning algorithm to infer connections between words in the large corpus of text. For example, Word2Vec algorithm utilizes a two-layer neural network that takes a large corpus of text and uniquely assigns each word in the corpus an associated word embedding in a latent space of several hundred dimensions. The dimensionality of the latent space correlates to word embeddings which are better described in relation to other word embeddings, thus there is a correlation between quality of word embeddings and dimensionality of the latent space in which the word embeddings exist. In a representative example, the embedding module 260 may assign a relatively high degree of similar word embeddings to the word "buy" and to the word "purchase" as the two words are synonyms of one another, thereby present in very similar contexts. In another example, the embedding module 260 may assign a relatively high degree of different word embeddings to the word "buy" and to the word "alligator" as the two words seemingly have very little in common. In other embodiments, the embedding module 260 further utilizes additional corpuses of text (e.g., words from content items in the online system 140).

Figure 3:
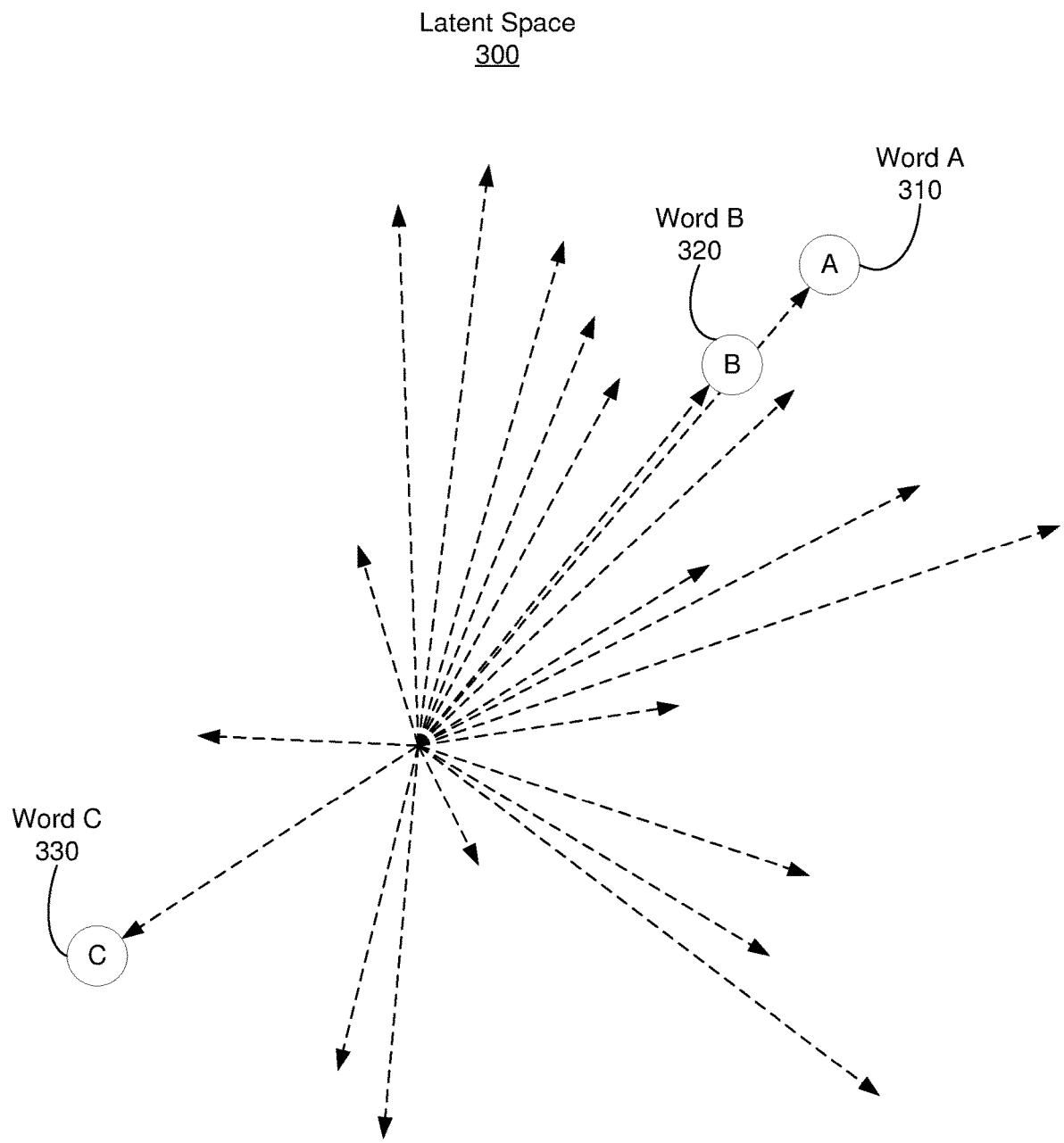
FIG. 3 is an illustrative representation of a latent space with word embeddings, in accordance with an embodiment.

FIG. 3 is an illustrative representation of a latent space 300 with word embeddings, in accordance with an embodiment. The latent space 300 is an embodiment of the embedding model 270 as described in FIG. 2 as a result of the embedding module 260 generating word embeddings. In this illustration, there are a number of word embeddings illustrated in a 2-dimensional vector space. One of ordinary skill in the art can understand that the embedding model 270 described can be n-dimensional vector space. The many word embeddings include a word A embedding 310, a word B embedding 320, and a word C embedding 330. As mentioned above in describing the embedding model 270, the embedding module 260 takes words from content items in the online system 140 and begins to generate word embeddings for each word. The resulting word embeddings have implicit correlation in the latent space. For example, word A embedding 310 and word B embedding 320 as shown in this illustration are relatively proximal. Quantifiably, the embedding module 260 may calculate a cosine similarity between word A embedding 310 and word B embedding 320. In contrast, word C embedding 330 is relatively distant from both word A embedding 310 and word B embedding 320. Thus the cosine similarity between word C embedding 330 and word A embedding 310 would be drastically different than that between word A embedding 310 and word B embedding 320. The proximity of word embeddings relates to a trained correlation between the words based on corpuses of text used to train the model.

The embedding module 260 further generates user embeddings based on content items each of the users have interacted with. For each user profile, the embedding module 260 identified one or more content items that the user interacted with. For example, the embedding module 260 access a list of content items that are associated with the user in the action log 220. The embedding module 260 combines word embeddings of words associated with each of the content items the user has interacted with to generate a user embedding for with the user. In some embodiments, the embedding module 260 combines word embeddings of keywords associated with each content item the user has interacted with.

Figure 4:
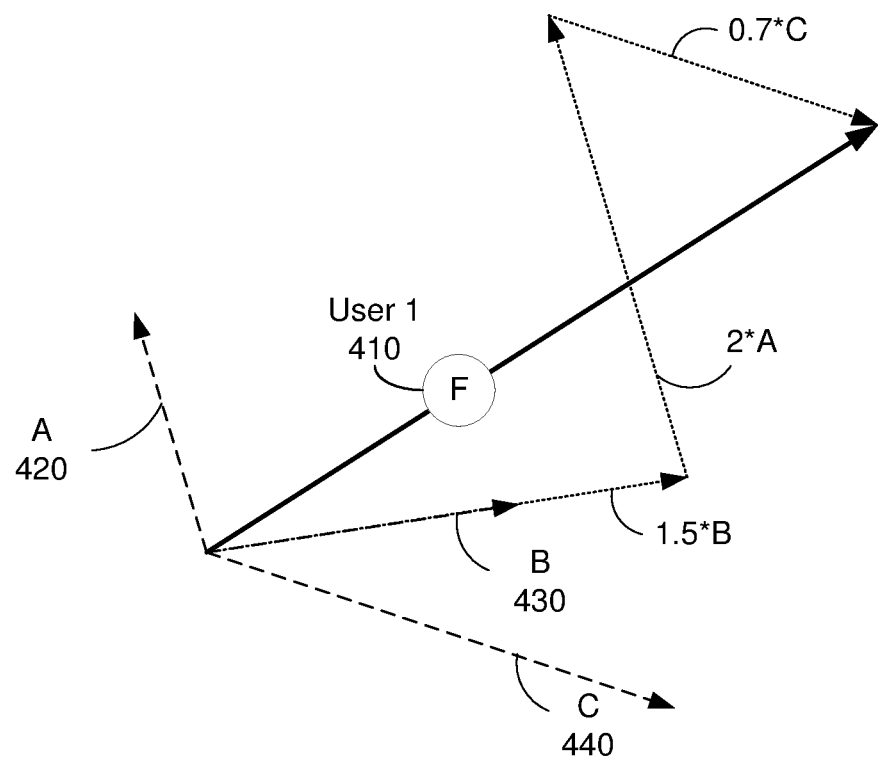
FIG. 4 is an illustration of generating a user embedding with word embeddings in the latent space, in accordance with an embodiment.

FIG. 4 is an illustration of generating a user embedding with word embeddings in the latent space, in accordance with an embodiment. In this illustration, the embedding module 260 generates user embeddings from word embeddings of three keywords associated with three content items the user has previously interacted with. In one embodiment, the embedding module 260 sums all word embeddings and normalizes based on the number of word embeddings. In this embodiment, each word embedding is normalized based on a total number of word embeddings used to generate the user embedding. All normalized word embeddings are then summed together to generate the user embedding. For example, the embedding module 260 identifies 5 word embeddings associated with 5 keywords derived from content items with which a user has interacted with. The embedding module 260 multiplies each word embedding by a normalization factor of a fifth prior to summing the 5 normalized word embeddings to generate the user embedding. This method of normalization helps to balance users that interact with varying numbers of content items, such as balancing one user that has interacted with 5 content items and another user that has interacted with 100 content items.

In another embodiment, the embedding module 260 generates a weighting factor for each of the word embeddings with which to scale the word embeddings prior to generating the user embedding. In this embodiment, the embedding module 260 generates a weighting factor based on recurrences of the keyword in all or a subset of content items listed in the action log. For example, the embedding module 260 divides a total number of recurrences of the keyword with the number of content items that the keyword appears in. Additionally, the weighting factor can be normalized for number of content items or for number of keywords. In some embodiments, the weighting factor for a keyword is determined using term frequency-inverse document frequency (TF-IDF) for the keywords. In a general form of TF-IDF, the weighting factor for a keyword is calculated by taking a ratio of the number of recurrences of a word in a body of text over a frequency of the word in a body of text. In one manner, the TF-IDF weighting factor can be calculated for each word embedding considering the content item it is selected from or all content items interacted with by the user. In the example of FIG. 4, the embedding module 260 generates a user embedding 410 for user 1 by applying a factor of 2 for word embedding 420 for word A, a factor of 1.5 for word embedding 430 for word B, and a factor of 0.7 for word embedding 440 for word C. In another example of generating weighting factors the embedding module 260 assigns a weighting factor based on the type of component the keyword is located in. For instance, the embedding module 260 generates a higher weight for words in a title of the content item compared to words in a body text of the content item.

The embedding module 260 further generates cluster embeddings for clusters of users. In some embodiments, the embedding module 260 generates cluster embeddings for clusters of users clustered by the clustering module 280. The embedding module generates the cluster embeddings by combining the user embeddings of each user in the cluster. As one embodiment, the cluster embeddings is calculated as a centroid of the user embeddings of each user in the cluster.

The embedding module 260 further generates targeting embeddings for a content item stored in the content item store. In one embodiment, the embedding module 260 accesses a content item and a set of content keywords either derived by the embedding module 260 based on recurring words in the content item or specified by a content sponsor. The embedding module 260 generates a targeting embedding for the content item by combining the word embeddings of each of the content keywords. In additional embodiments, the embedding module 260 normalizes each targeting embedding based on the number of word embeddings used to generate the targeting embedding along similar principles as those described in conjunction with generating user embeddings. For example, the embedding module 260 identifies 10 word embeddings with which to generate the targeting embedding. The embedding module 260 normalizes by taking an inverse of the total number of word embeddings multiplied to the sum of the word embeddings. In another embodiment, the embedding module 260 generates a weighting factor for each word embedding used to generate the targeting embedding.

The clustering module 280 clusters users based on the user embeddings in the embedding model 270. In some embodiment, the clustering module 280 clusters user embeddings into multiple clusters. One clustering algorithm involves performing a principal component analysis (PCA) with the user embeddings in the latent space. The clustering module 280 may additionally perform multiple iterations of the clustering algorithm to generate sub-clusters within each of the clusters to distinguish in varying stages the numerous user embeddings into the clusters with finer granularity. At a first level, the clusters formed are the most distinct from one another in the latent space. In subsequent levels, the distinction between clusters progressively becomes finer, thereby providing finer granularity between clusters. For example, the clustering algorithm may generate a set number of clusters (e.g., 256 clusters) each time is executed on a set of users. As such, a first level clustering clusters each of the users of the online system 140 into 256 clusters. A second level clustering then clusters the users in each of the first level clusters into 256 sub-clusters. In some embodiments, the clustering module 280 further performs the clustering algorithm one or more times on each of the sub-clusters.

Figure 5A:
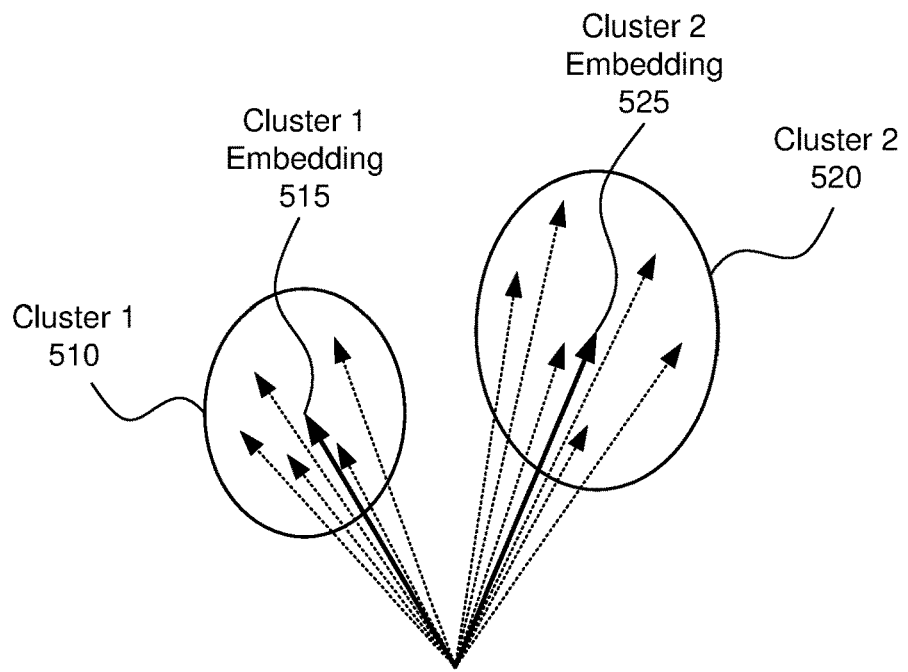
FIG. 5A is an illustration cluster embeddings generated from user embeddings in the latent space, in accordance with an embodiment.

FIG. 5A is an illustration of generating a cluster embedding from user embeddings in the latent space, in accordance with an embodiment. After the clustering module 280 clusters user embeddings into clusters, the embedding module 260 generates a cluster embedding for each cluster. In one embodiment, the embedding module 260 averages all user embeddings within a cluster to generate the cluster embedding. In another embodiment, the embedding module 260 may access keyword embeddings utilized to generate the user embeddings within each cluster. The embedding module 260 may increase weighting of certain keyword embeddings which are common to all user embeddings within the cluster. In the example illustration, the clustering module 280 determines two clusters—cluster 1 510 and cluster 2 520. For each of the two clusters, the embedding module 260 averages the user embeddings included in each cluster to determine the cluster embedding 515 for cluster 1 and cluster embedding 525 for cluster 2

Figure 5B:
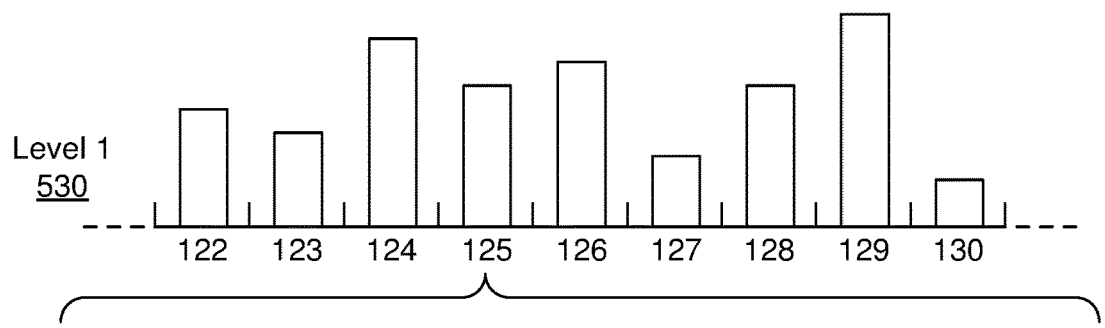
FIG. 5B is an illustration of progressive clustering of user embeddings by principal component analysis (PCA) in the latent space, in accordance with an embodiment.
Figure 5B:
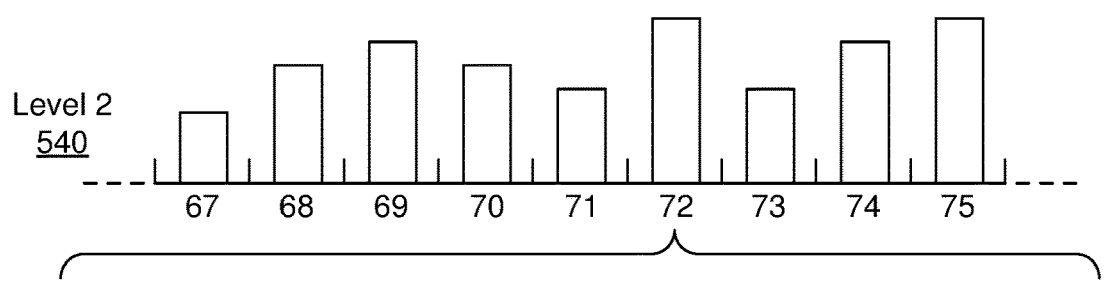
Figure 5B:
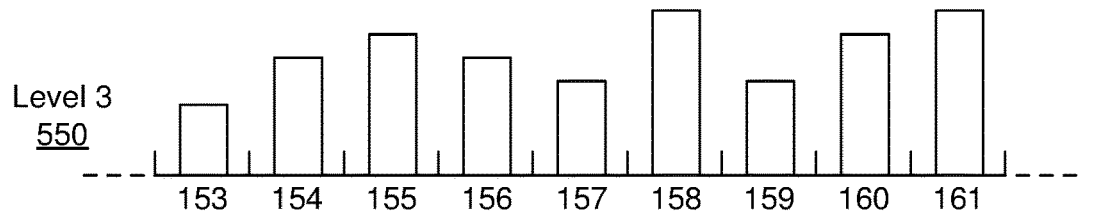

FIG. 5B is an illustration of progressive clustering of user embeddings by principal component analysis (PCA), in accordance with an embodiment. One clustering algorithm, as described above, involves performing PCA with the user embeddings in the latent space. The clustering module 280 may additionally perform multiple iterations of PCA to generate a plurality of progressive levels further subdividing each cluster with finer granularity. For example, in the embodiment shown in FIG. 5B, the clustering module 280 performs at least three iterations of PCA. At the first level 530, the clustering module 280 generates a set number of clusters (e.g., 256 clusters), wherein each cluster may have a number of users. Taking each cluster from the first level 530, the clustering module 280 performs a second iteration of PCA to generate the second level 540 of clustering. As shown in FIG. 5B, the clustering module 280 takes cluster 125 from the first level 530 and further subdivides cluster 125 into a set number of sub-clusters (e.g., 256 sub-clusters) in the second level 540. In another iteration, the clustering module 280 performs a third iteration of PCA with each of the clusters in the second level 540 to generate the third level 550 of clustering. As shown in the illustration, the clustering module 280 takes sub-cluster 72 of cluster 125 and further subdivides into a set number of sub-clusters in the third level 550. With each iteration by the clustering module 280, the numbers of users per cluster reduces. In an example, one cluster has over 10,000 users. As the clustering module 280 takes the one cluster and subdivides into 100 sub-clusters, on average each sub-cluster has 1,000 users. The clustering module 280 may continue iterating until average number of users per sub-cluster in a level is below a threshold sub-cluster size. To keep track of all sub-clusters, the clustering module 280 may generate a cluster vector as an identification for each sub-cluster. Each cluster vector includes a cluster's number at each level of iteration. For example, cluster 153 in the third level 550 would have a cluster vector of <125, 72, 153>.

The content selection module 290 selects one or more content items for communication to a client device 110 to be presented to a user. Content items eligible for presentation to the user are retrieved from the content store 230 or from another source (e.g., a third party system) by the content selection module 290, and one or more of the content items for presentation to the viewing user are selected from the retrieved eligible content items. The content selection module 290 accesses a plurality of candidate content items to be presented to users. For any given candidate content item, the content selection module 290 compares the targeting embedding to each cluster embedding to generate a score describing an affinity between users in the clusters and the content item. In some embodiments, the score is based on a distance between the targeting embedding and each cluster embedding. The process for generating a score describing distance between the targeting embedding and each cluster embedding will be further described in conjunction with FIG. 6. Once the clusters are scored, the content selection module 290 may rank the clusters based on the generated scores in order to select clusters for presentation of the candidate content item. In other embodiments, the content selection module 290 further scores one or more individual user embeddings by comparing the user embedding of the one or more individual users to the targeting embedding. Then the content selection module 290 may choose a subset of the users within a cluster based on their ranked scores.

The content selection module 290 may select a plurality of clusters to achieve a reach goal of the candidate content item, in accordance with some embodiments. In some embodiments, the candidate content item has a reach goal which corresponds to a number of unique users that is desired for presentation of the candidate content item. To achieve the reach goal, the content selection module 290 selects from different levels of clustering. In one embodiment, the content selection module 290 ranks clusters on a first level based on the scores and compares a number of users in the first ranked cluster on the first level with the reach goal. If the first ranked cluster is greater than the reach goal, then the content selection module 290 can rank the sub-clusters within the first ranked cluster. If a number of users within the first ranked sub-cluster is still greater than the reach goal, the content selection module 290 can further consider another subsequent level. Once a number of users the first ranked sub-cluster at a certain level is below the reach goal, the content selection module 290 can select one or more sub-clusters at the same level until the number of users of all selected sub-clusters is greater than the reach goal. In some embodiment, a hamming distance function is used to select multiple clusters within a single level to achieve the reach goal. After the cluster with the number of users below the reach goal is identified, the hamming distance function is used to determine which other clusters within the same level are to be selected.

Content items eligible for presentation to the user may include content items associated with bid amounts. The content selection module 290 uses the bid amounts associated with content item requests when selecting content for presentation to the user. In various embodiments, the content selection module 290 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount associated with the content item and a likelihood of the user interacting with the content item. The content selection module 290 may rank content items based on their expected value and select content items having at least a threshold position in the ranking for presentation to the user. In some embodiments, the content selection module 290 ranks both content items not associated with bid amounts and content items associated with bid amounts in a unified ranking based on bid amounts and measures of relevance associated with content items. Based on the unified ranking, the content selection module 290 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

In various embodiments, the content selection module 290 presents content to a user through a newsfeed including a plurality of content items selected for presentation to the user. One or more content items may also be included in the feed. The content selection module 290 may also determine the order in which selected content items are presented via the feed. For example, the content selection module 260 orders content items in the feed based on likelihoods of the user interacting with various content items.

The web server 250 links the online system 140 via the network 120 of FIG. 1 to the one or more client devices 110 of FIG. 1, as well as to the one or more third party systems 130 of FIG. 1. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 230. Additionally, the web server 250 may provide application programming interface (API) functionality to send data directly to native client device operating systems, such as IOS®, ANDROID™, or BlackberryOS.

Process Overview

Figure 6:
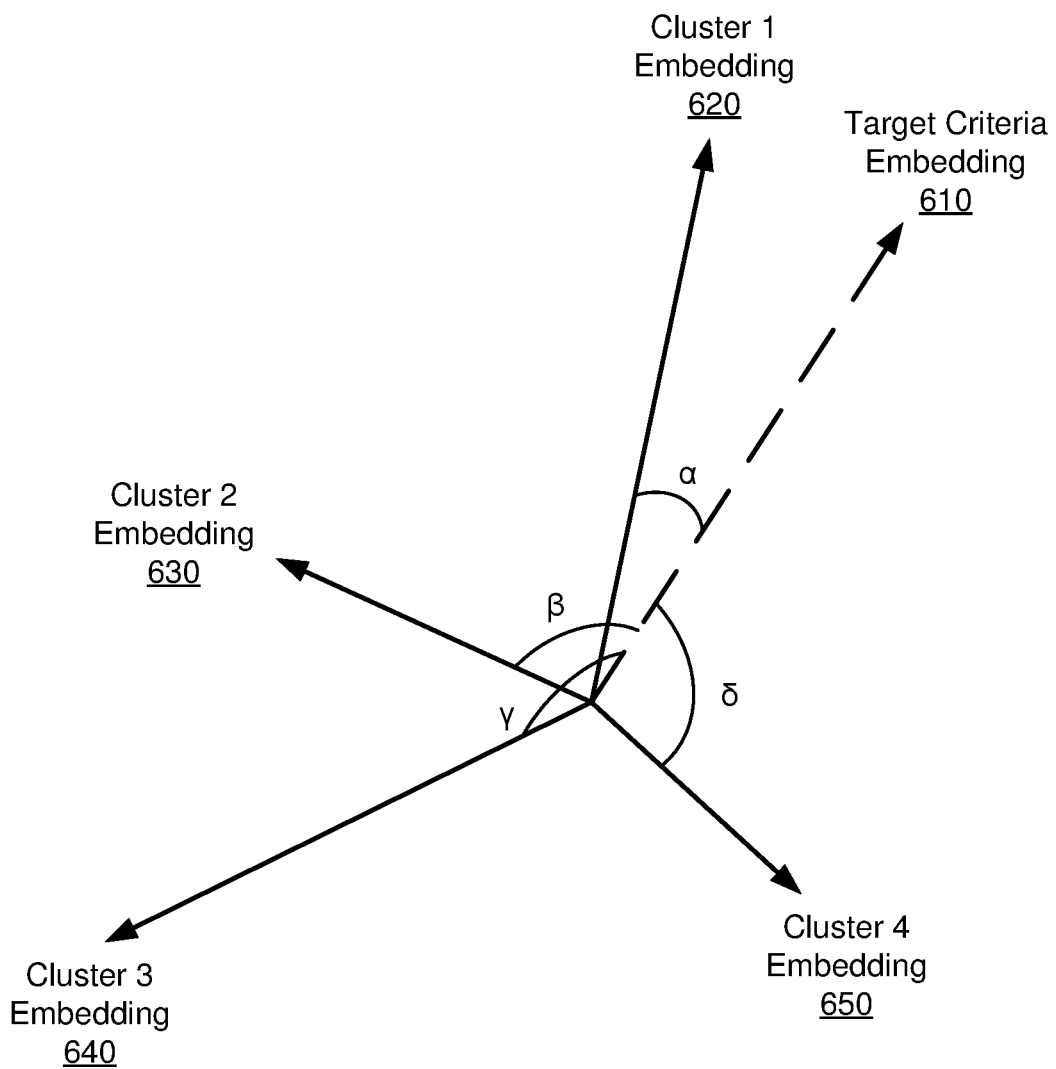
FIG. 6 is an illustration comparing a targeting embedding to cluster embeddings in the latent space, in accordance with an embodiment.

FIG. 6 is an illustration of comparing a targeting embedding to cluster embeddings in the latent space, in accordance with an embodiment. Once the cluster embeddings are generated for each cluster, the content selection module 290 compares a targeting embedding from a candidate content item to all or a subset of cluster embeddings in the latent space. In one embodiment, the content selection module 290 quantifies the comparison by calculating a cosine similarity between two embeddings. In other embodiments, the content selection module 290 calculates an angle between two embeddings. With the angles, the content selection module 290 generates a relevance score for each of the cluster embeddings dependent on the calculated angle. In FIG. 6, there is a targeting embedding 610 being compared to cluster embedding 620, cluster embedding 630, cluster embedding 640, and cluster embedding 650. Between the various cluster embeddings, the calculated angles are used to generate a relevance score. Cluster 1 has an angle α between the cluster embedding 620 and the targeting embedding 610. Similarly, cluster 2 has an angle β; cluster 3 has an angle γ; cluster 4 has an angle S. Based on these angles, the content selection module 290 determines that a is the smallest angle with the remaining angles all bigger than angle α. In the example of FIG. 6, the content selection module 290 generates a relevance score with the angles such that cluster 1 would be scored the highest given that cluster 1 has the smallest angle with the targeting embedding 610. As mentioned hereinabove, the content selection module 290 ranks the clusters based on the generated relevance scores. From the ranking, the content selection module 290 selects one or more clusters and the users associated with the selected clusters for presentation of the candidate content item. In the example of FIG. 6, as cluster 1 has the largest score of the bunch, the content selection module 290 selects the users in cluster 1 for presentation of the content item associate with the targeting embedding 610.

Figure 7:
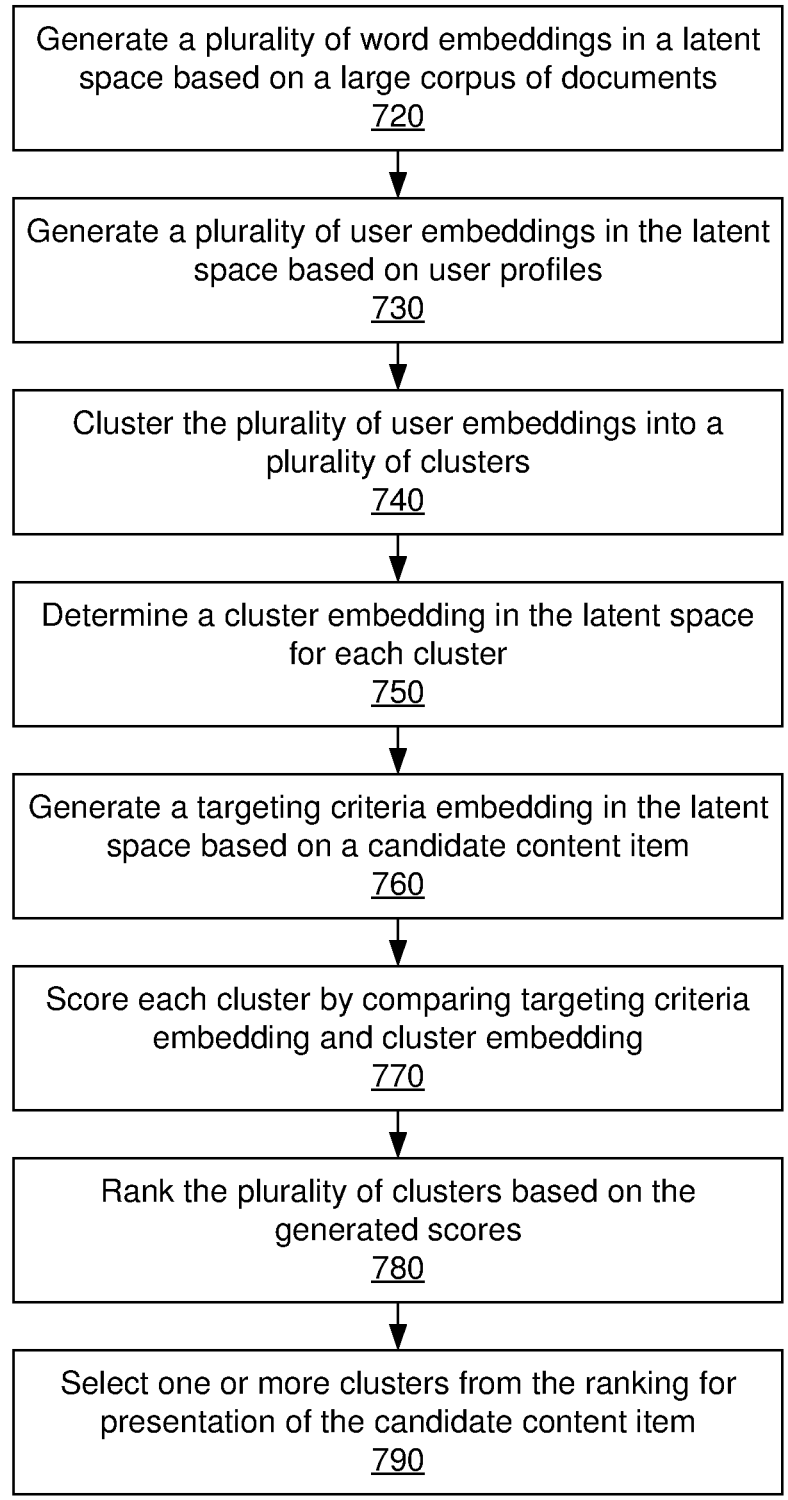
FIG. 7 is a flowchart describing a process of targeting users for a candidate content item, in accordance with an embodiment.

FIG. 7 is a flowchart illustrating a method 700 of targeting users for a candidate content item, in accordance with an embodiment. The process involves a number of steps which may be accomplished by any number or any combination of the various modules and stores in the online system 140.

The embedding module 260 generates 720 a plurality of word embeddings based on a large corpus of documents. In some embodiments, the word embeddings are generated based on the text of content items stored by the online system 140. In other embodiments, the word embeddings are generated based on a large text collection, such as an encyclopedia. In yet other embodiments, the word embedding are retrieved from word embedding database or dataset created from a trained model (e.g., Word2Vec).

The embedding module 260 generates 730 a plurality of user embeddings for each user of the online system 140. The online system 140 accesses a user profile including a list of a plurality of content items with which that user has interacted. In one embodiment, the online system 140 takes each listed content item and identifies a keyword and the word embedding associated with the keyword. To generate 730 a user embedding for a user profile, the online system 140 takes a linear combination of the word embeddings of the identified keywords. In other embodiments, the online system 140 generates a weighting factor for each identified keywords.

The clustering module 280 clusters 740 user embeddings into a plurality of clusters. The clustering module 280 may cluster 740 the users with a variety of clustering algorithms which have been described hereinabove. In one embodiment, the clustering module 280 performs a principal component analysis for clustering the user embeddings.

The embedding module 260 determines 750 a cluster embedding for the clusters generated by the clustering module 280 in step 740. The embedding module 260 generates a cluster embedding from the user embeddings in the cluster. In one embodiment, the embedding module 260 averages the user embeddings in the cluster to determine the cluster embedding for the cluster.

The embedding module 260 generates 760 a targeting embedding based on a characteristics or properties of a candidate content item. In one embodiment, the embedding module 260 identifies a keyword for the content item and determines or retrieves an associated word embedding for the keyword. In other embodiments, the embedding module 260 combines more than one word embeddings related to various words in the candidate content item.

The content selection module 290 scores 770 each cluster by comparing the targeting embedding to cluster embeddings of each of the clusters. In one embodiment, the content selection module 290 calculates a cosine similarity between the targeting embedding and each of the cluster embeddings. In an alternate embodiment, the content selection module 290 factors in the difference in magnitude of the targeting embedding and the cluster embeddings. The content selection module 290 may score 770 each cluster based on the cosine similarity calculations.

The content selection module 290 ranks 780 the plurality of clusters based on the generated scores. The content selection module 290 then selects 790 one or more clusters based on the ranking for presentation of the target content item. In some embodiments, out of the selected one or more clusters, the content selection module 290 selects the users that are eligible for presentation of the candidate content item.

The process of targeting users for a candidate content item by clustering user embeddings and comparing those clusters and the cluster embeddings with a targeting embedding greatly streamlines a process of determining a target audience for presentation of a particular content item. Existing methods of determining a target audience revolved around comparing whether each individual user had characteristics that matched targeting criteria specified by a content item. However, according to embodiments disclosed, user embeddings are generated from word embeddings associated with words in posts which each user has interacted with, thereby, creating an avenue for comparing a targeting criteria and a user's interactions with posts. Another advantage is that clustering of user embeddings occurs in the latent space wherein multiple iterations of further subdivision of clusters can achieve finer granularity in differentiation between sub-clusters after multiple iterations. Additionally, optimizing the number of selected clusters based on a reach goal for a candidate content item allows the online system 140 to better achieve the reach goal for the candidate content item.

Although the method 700 describes an overall process of targeting users for a candidate content item, the online system 140 may implement any of the principles described herein for other embodiments of targeting users for a candidate content item. Similarly, the various steps described in the method 700 can be further altered for other embodiments of this present disclosure.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    generating a plurality of user embeddings for a plurality of users, wherein generating a user embedding for a user of the plurality of users comprises:
        identifying one or more content items interacted with by the user,
        identifying one or more keywords associated with the one or more content items interacted by the user, wherein the one or more keywords are identified from the content of the plurality of content items,
        identifying one or more word embeddings for the one or more keywords, and
        generating the user embedding from a combination of the one or more word embeddings;
    clustering the plurality of users to generate a plurality of clusters, each cluster including a subset of the plurality of users, the clustering based on the plurality of user embeddings;
    determining a cluster embedding for each cluster of the plurality of clusters;
    generating a targeting embedding from a candidate content item, the candidate content item having a reach objective specifying a target number of different users to be presented with the candidate content item, the targeting embedding based on words from the candidate content item;
    for each cluster of the plurality of clusters, generating a score by comparing the targeting embedding and the cluster embedding of the cluster;
    ranking the plurality of clusters based on the generated scores; and
    selecting one or more clusters based on the ranking, wherein the candidate content items is designated for presentation to each subset of users associated with the selected one or more clusters, comprising:
        selecting a first cluster from the plurality of clusters, the first cluster having a highest score among the clusters in the plurality of clusters, and
        responsive to the number of users in the first cluster being smaller than the reach objective, selecting a second cluster, the second cluster having a shortest hamming distance from the first cluster.

2. The method of claim 1, wherein generating the plurality of user embeddings for the plurality of users further comprises:
    for each keyword of the one or more keywords:
        identifying a first number of appearances of the keyword in the plurality of posts included in the user profile,
        identifying a second number of posts of the plurality of posts included in the user profile in which the keyword appears, and
        generating a weight factor of the keyword based on a ratio of the first number and the second number; and
    wherein generating the user embedding from a combination of the one or more keyword embeddings comprises summing each keyword embedding multiplied by the corresponding weight factor.

3. The method of claim 1, wherein the cluster embedding for a cluster of the plurality of clusters is calculated as an average of user embeddings of users in the cluster.

4. The method of claim 1, wherein the generated score is based on a distance between the targeting embedding and each cluster embedding.

5. The method of claim 1, wherein the generated score is based on a cosine similarity of the targeting embedding and the cluster embedding.

6. The method of claim 1, wherein clustering the plurality of user embeddings comprises performing a principal component analysis on the plurality of user embeddings.

7. The method of claim 1, wherein clustering the plurality of user embeddings comprises:
    performing a principal component analysis on the plurality of user embeddings to generate a plurality of first level clusters; and
    for each first level cluster of the plurality of first level clusters, performing the principal component analysis to generate a plurality of second level clusters.

8. The method of claim 1, further comprising:
    presenting the candidate content item to one or more users of the selected one or more clusters.

9. The method of claim 1, further comprising:
    determining a reach for the candidate content item based on a number of users in the selected one or more clusters.

10. A computer-readable non-transitory storage medium storing instructions that, when executed by a processor, cause the processor to:

generate a plurality of user embeddings for a plurality of users, wherein generating a user embedding for a user of the plurality of users comprises:
  identify one or more content items interacted by the user,
  identify one or more keywords associated with the one or more content items interacted by the user, wherein the one or more keywords are identified from the content of the plurality of posts,
  identify one or more word embeddings for the one or more keywords, and
  generate the user embedding from a combination of the one or more word embeddings;
cluster the plurality of user embeddings to generate a plurality of clusters, each cluster including a subset of the plurality of users, the clustering based on the plurality of user embeddings;
determine a cluster embedding for each of the plurality of clusters;
generate a targeting embedding from a candidate content item, the candidate content item having a reach objective specifying a target number of different users to be presented with the candidate content item, the targeting embedding based on words from the candidate content item;
for each cluster of the plurality of clusters, generate a score by comparing the targeting embedding and the cluster embedding of the cluster;
rank the plurality of clusters based on the generated scores; and
select one or more clusters based on the ranking, the selected one or more clusters including users for presentation of the candidate content item, comprising:
  selecting a first cluster from the plurality of clusters, the first cluster having a highest score among the clusters in the plurality of clusters, and
  responsive to the number of users in the first cluster being smaller than the reach objective, selecting a second cluster, the second cluster having a shortest hamming distance from the first cluster.

11. The storage medium of claim 10, wherein generate the plurality of user embeddings for the plurality of users further comprises:
for each keyword of the one or more keywords:
  identify a first number of appearances of the keyword in the plurality of posts included in the user profile,
  identify a second number of posts of the plurality of posts included in the user profile in which the keyword appears, and
  generate a weight factor of the keyword based on a ratio of the first number and the second number; and
wherein generate the user embedding from a combination of the one or more keyword embeddings comprises summing each keyword embedding multiplied by the corresponding weight factor.

12. The storage medium of claim 10, wherein the cluster embedding for a cluster of the plurality of clusters is calculated as an average of user embeddings of users in the cluster.

13. The storage medium of claim 10, wherein the generated score is based on a distance between the targeting embedding and each cluster embedding.

14. The storage medium of claim 10, wherein the generated score is based on a cosine similarity of the targeting embedding and the cluster embedding.

15. The storage medium of claim 10, wherein cluster the plurality of user embeddings comprises perform a principal component analysis on the plurality of user embeddings.

16. The storage medium of claim 10, wherein cluster the plurality of user embeddings comprises:
perform a principal component analysis on the plurality of user embeddings to generate a plurality of first level clusters; and
for each first level cluster of the plurality of first level clusters, perform the principal component analysis to generate a plurality of second level clusters.

17. The storage medium of claim 10, further comprising instructions that, when executed by the processor, cause the processor to:
present the candidate content item to one or more users of the selected one or more clusters.

18. The storage medium of claim 10, further comprising instructions that, when executed by the processor, cause the processor to:
determine a reach for the candidate content item based on a number of users in the selected one or more clusters.

* * * * *